US012177897B2

(12) United States Patent
Cui et al.

(10) Patent No.: US 12,177,897 B2
(45) Date of Patent: Dec. 24, 2024

(54) MITIGATION OF LISTEN BEFORE TALK CONFLICTS IN THE UNLICENSED SPECTRUM

(71) Applicant: Apple Inc., Cupertino, CA (US)

(72) Inventors: Jie Cui, San Jose, CA (US); Dawei Zhang, Saratoga, CA (US); Hong He, San Jose, CA (US); Manasa Raghavan, Sunnyvale, CA (US); Qiming Li, Beijing (CN); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 17/437,768

(22) PCT Filed: Mar. 31, 2021

(86) PCT No.: PCT/CN2021/084303
§ 371 (c)(1),
(2) Date: Sep. 9, 2021

(87) PCT Pub. No.: WO2022/205037
PCT Pub. Date: Oct. 6, 2022

(65) Prior Publication Data
US 2022/0369369 A1    Nov. 17, 2022

(51) Int. Cl.
*H04W 74/0808*    (2024.01)
(52) U.S. Cl.
CPC ............... *H04W 74/0808* (2013.01)
(58) Field of Classification Search
CPC ........... H04W 74/0808; H04W 74/0825
See application file for complete search history.

(56) References Cited

U.S. PATENT DOCUMENTS

2020/0112978 A1* 4/2020 Zhang ............... H04W 72/21
2021/0195544 A1* 6/2021 Awad ............... H04B 17/318
(Continued)

FOREIGN PATENT DOCUMENTS

CN   110831234 A    2/2020
CN   111837444 A   10/2020
(Continued)

OTHER PUBLICATIONS

International Search Report for PCT Patent Application No. PCT/CN2021/084303; mailed Nov. 19, 2021.
(Continued)

*Primary Examiner* — Abdullahi Ahmed
(74) *Attorney, Agent, or Firm* — Kowert, Hood, Munyon, Rankin & Goetzel, P.C.

(57) ABSTRACT

Apparatuses, systems, and methods for mitigation of listen before talk conflicts in the unlicensed spectrum. A wireless device may receive one or more synchronization signal blocks (SSBs) from a base station (BS) as part of a measurement procedure with listen before talk (LBT). The wireless device may determine one or more LBT failures associated with one or more receive beams of the wireless device. Furthermore, in response to determining the one or more LBT failures associated with the one or more receive beams of the wireless device, the wireless device may extend a measurement period for the one or more receive beams of the wireless device. The wireless device may then receive one or more additional SSBs on the one or more receive beams of the wireless device.

20 Claims, 15 Drawing Sheets

(56) References Cited

U.S. PATENT DOCUMENTS

| | | | | |
|---|---|---|---|---|
| 2021/0204234 A1* | 7/2021 | Xu | ................... | H04L 27/26025 |
| 2022/0330339 A1* | 10/2022 | Siomina | ............ | H04W 74/0816 |
| 2023/0156509 A1* | 5/2023 | Bolotin | ................ | H04W 24/08 |
| | | | | 370/329 |
| 2023/0269654 A1* | 8/2023 | Cui | ...................... | H04W 48/16 |
| | | | | 455/434 |

FOREIGN PATENT DOCUMENTS

| | | |
|---|---|---|
| CN | 111865864 A | 10/2020 |
| WO | 2020194274 | 10/2020 |
| WO | 2020223692 A1 | 11/2020 |

OTHER PUBLICATIONS

Extended European Search Report for EP Patent Application No. 21933715.1; Oct. 28, 2024.
Ericsson "L1-RSRP measurements in NR-U"; 3GPP TSG-RAN WG4 Meeting #93 R4-1914356; Nov. 22, 2019.
Ericsson "'L1-RSRP measurements in NR-U"; 3GPP SG-RAN WG4 Meeting #92 R4-1909159; Aug. 30, 2019.

* cited by examiner

MITIGATION OF LISTEN BEFORE TALK CONFLICTS IN THE UNLICENSED SPECTRUM

PRIORITY CLAIM INFORMATION

This application is a U.S. National Stage application of International Application No. PCT/CN2021/084303, filed Mar. 31, 2021, titled "Mitigation of Listen Before Talk Conflicts in the Unlicensed Spectrum", which is hereby incorporated by reference in its entirety.

FIELD

The invention relates to wireless communications, and more particularly to apparatuses, systems, and methods for mitigation of listen before talk conflicts in an unlicensed spectrum.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

Further, wireless communication technology has evolved from voice-only communications to also include the transmission of data, such as Internet and multimedia content. Additionally, interference, collisions and conflicts between transmissions of one or multiple radio access technologies (RATs) are increasingly possible (e.g., in unlicensed spectrum). For example, collisions may be possible between transmissions, e.g., between 5G/cellular transmissions and/or wireless local area network (WLAN) transmissions. Interference, collisions, and conflicts may degrade the wireless ecosystem and lead to negative impacts on users, e.g., of one or more RATs. Accordingly, improvements in the field in support of such development and design are desired.

SUMMARY

Embodiments relate to wireless communications, and more particularly to apparatuses, systems, and methods for mitigation of listen before talk conflicts in an unlicensed spectrum.

For example, a wireless device may receive one or more synchronization signal blocks (SSBs) as part of a measurement procedure with listen before talk (LBT), e.g., performed in an unlicensed spectrum corresponding to the 52.6 to 71 GHz frequency range. The wireless device may determine one or more LBT failures corresponding to one or more receive beams of the wireless device. In response to determining the one or more LBT failures, the wireless device may extend a measurement period for the one or more receive beams of the wireless device. The wireless device may receive one or more additional SSBs on the one or more receive beams of the wireless device.

In some embodiments, the wireless device may determine a first LBT failure of the one or more LBT failures corresponding to a first receive beam of the one or more receive beams extend the measurement period for the first receive beam or all of the one or more receive beams. In addition, the wireless device may determine, e.g., based on a number of the one or more LBT failures being less than a threshold value, that an extension of the measurement is not needed. Moreover, the extended measurement period may be based, at least in part, on a ceiling factor corresponding to a ratio of the one or more LBT failures to a maximum number of receive beams of the one or more receive beams and/or a floor factor corresponding to a ratio of the one or more LBT failures to a threshold value, and wherein the threshold value is less than or equal to a maximum number of receive beams of the one or more receive beams. Additionally, if the extended measurement period exceeds a maximum extension value and a total number of the one or more LBT failures is less than a maximum number of receive beams of the one or more receive beams, the wireless device may be further configured to discard previously received physical layer samples on the one or more receive beams and restart the measurement procedure with LBT.

In some embodiments, if a total number of the one or more LBT failures is less than a percentage of a maximum number of receive beams of the one or more receive beams, the wireless device may be further configured to determine measurement results based on the received SSBs.

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
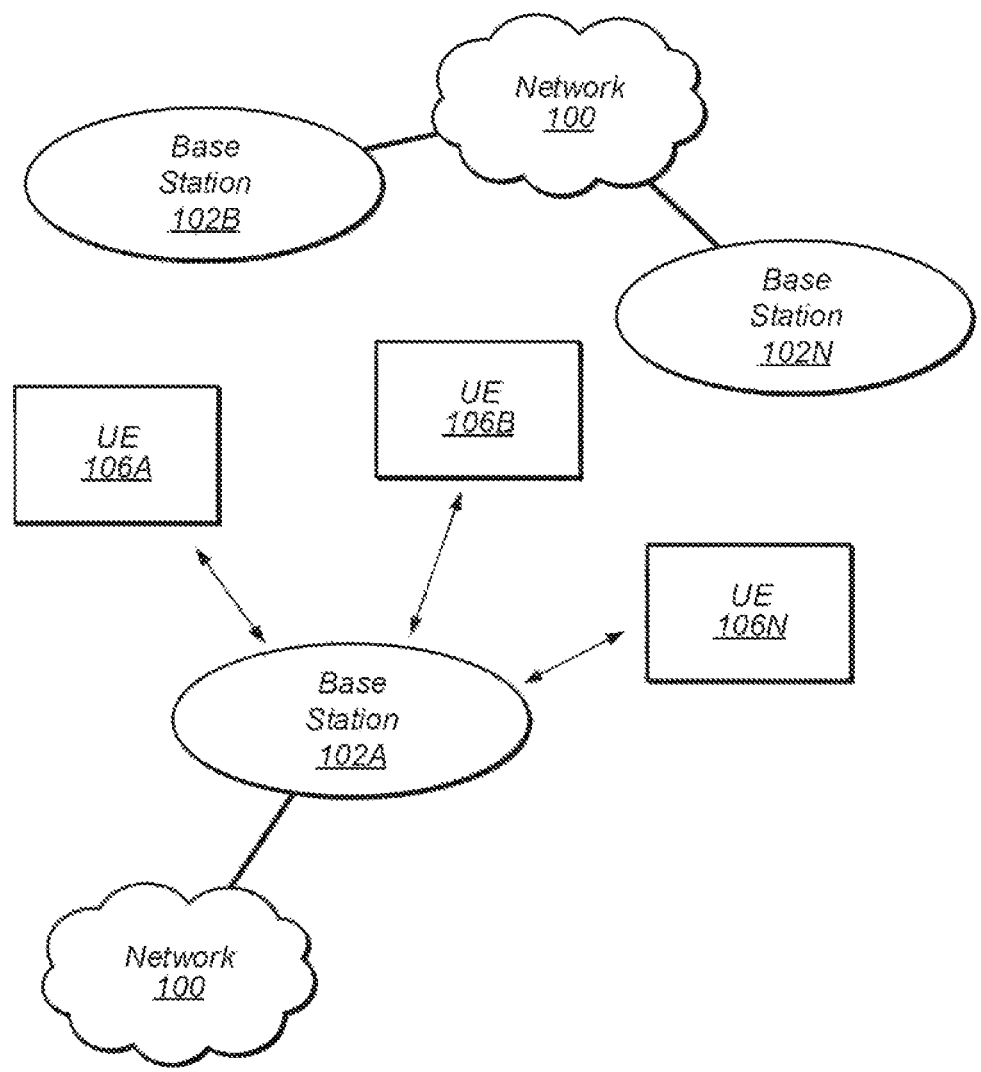
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element
ITS: Intelligent Transportation System
LBT: Listen Before Talk
SSB: Synchronization Signal Block
RRM: Radio Resource Management
RLM: Radio Link Management
BM: Broadcast Multicast
COT: Channel Occupancy Time
QCL: Quasi-Colocated
SMTC: SSB-Based RRM Measurement Timing Configuration
DBTW: Discovery Burst Transmission Window
PHY: Physical Layer
CSSF: Carrier Specific Scaling Factor Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by (or with) a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
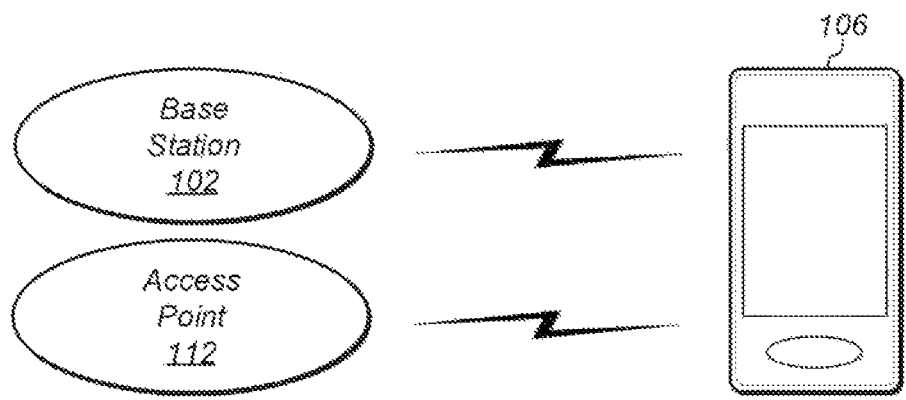
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
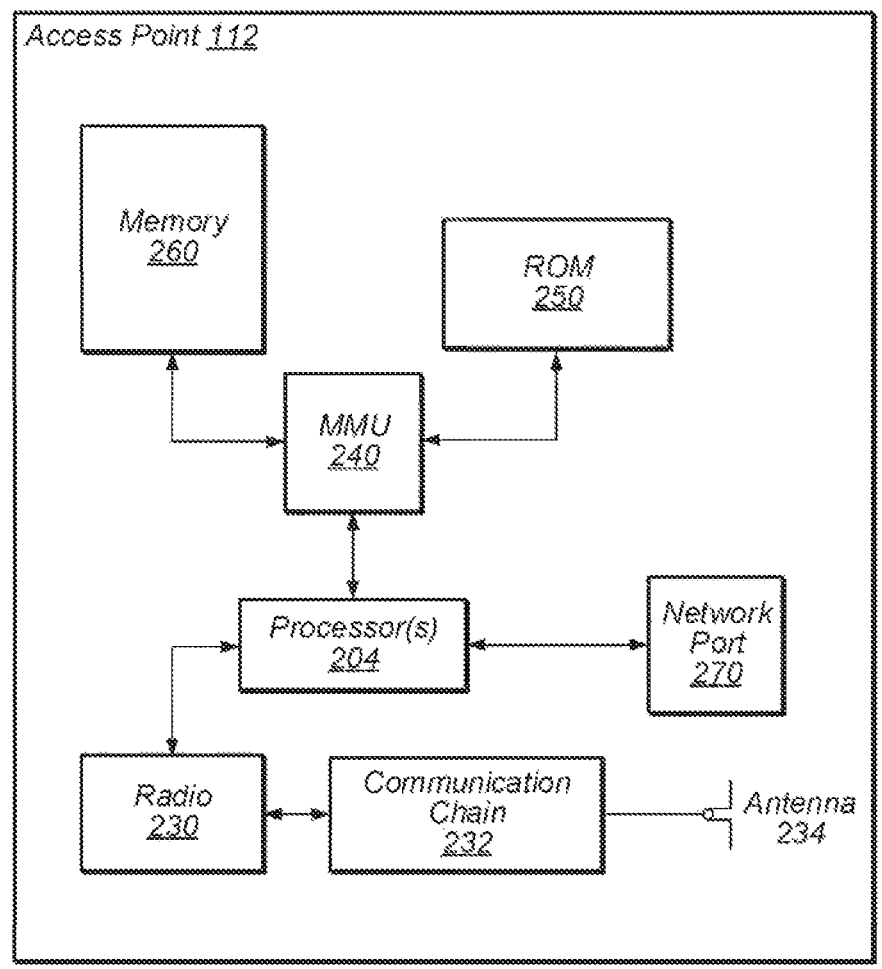
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for overhead reduction for multi-carrier beam selection and power control as further described herein.

Figure 3A:
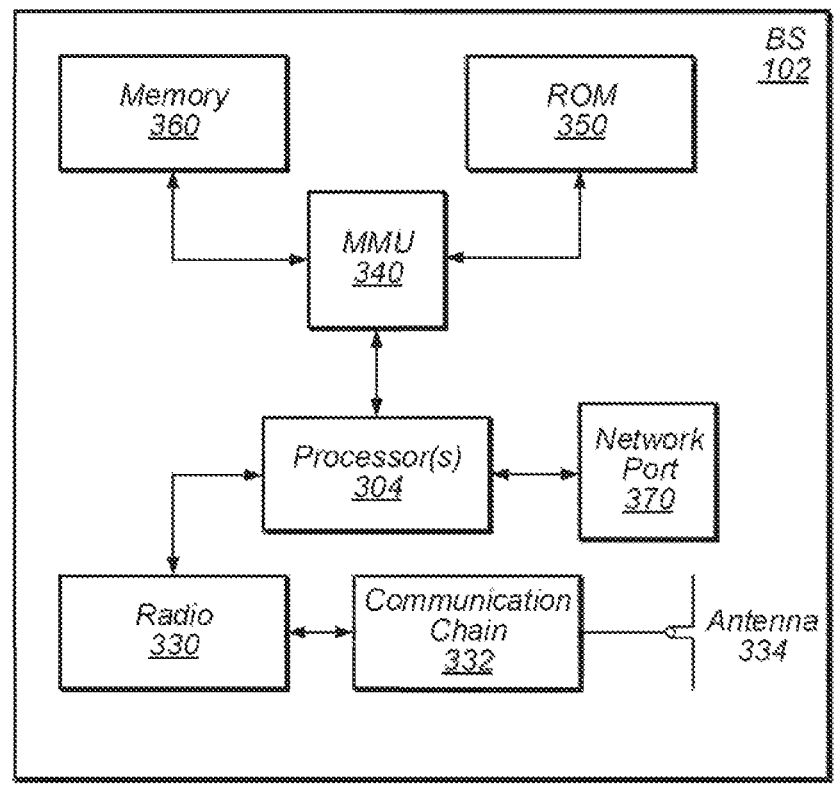
FIG. 3A illustrates an example block diagram of a BS according to some embodiments.

FIG. 3A: Block Diagram of a Base Station

FIG. 3A illustrates an example block diagram of a base station 102, according to some embodiments. It is noted that the base station of FIG. 3A is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIGS. 1 and 2.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 334, and possibly multiple antennas. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 304 of the base station 102 may be configured to implement or support implementation of part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof. Alternatively (or in addition) the processor 304 of the BS 102, in conjunction with one or more of the other components 330, 332, 334, 340, 350, 360, 370 may be configured to implement or support implementation of part or all of the features described herein.

In addition, as described herein, processor(s) 304 may be comprised of one or more processing elements. In other words, one or more processing elements may be included in processor(s) 304. Thus, processor(s) 304 may include one or more integrated circuits (ICs) that are configured to perform the functions of processor(s) 304. In addition, each integrated circuit may include circuitry (e.g., first circuitry, second circuitry, etc.) configured to perform the functions of processor(s) 304.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 3B:
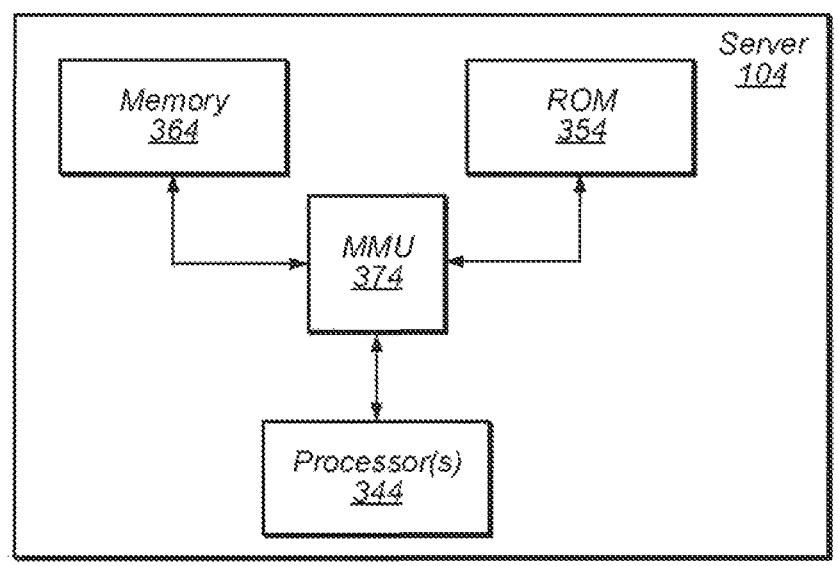
FIG. 3B illustrates an example block diagram of a server according to some embodiments.

FIG. 3B: Block Diagram of a Server

FIG. 3B illustrates an example block diagram of a server 104, according to some embodiments. It is noted that the server of FIG. 3B is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
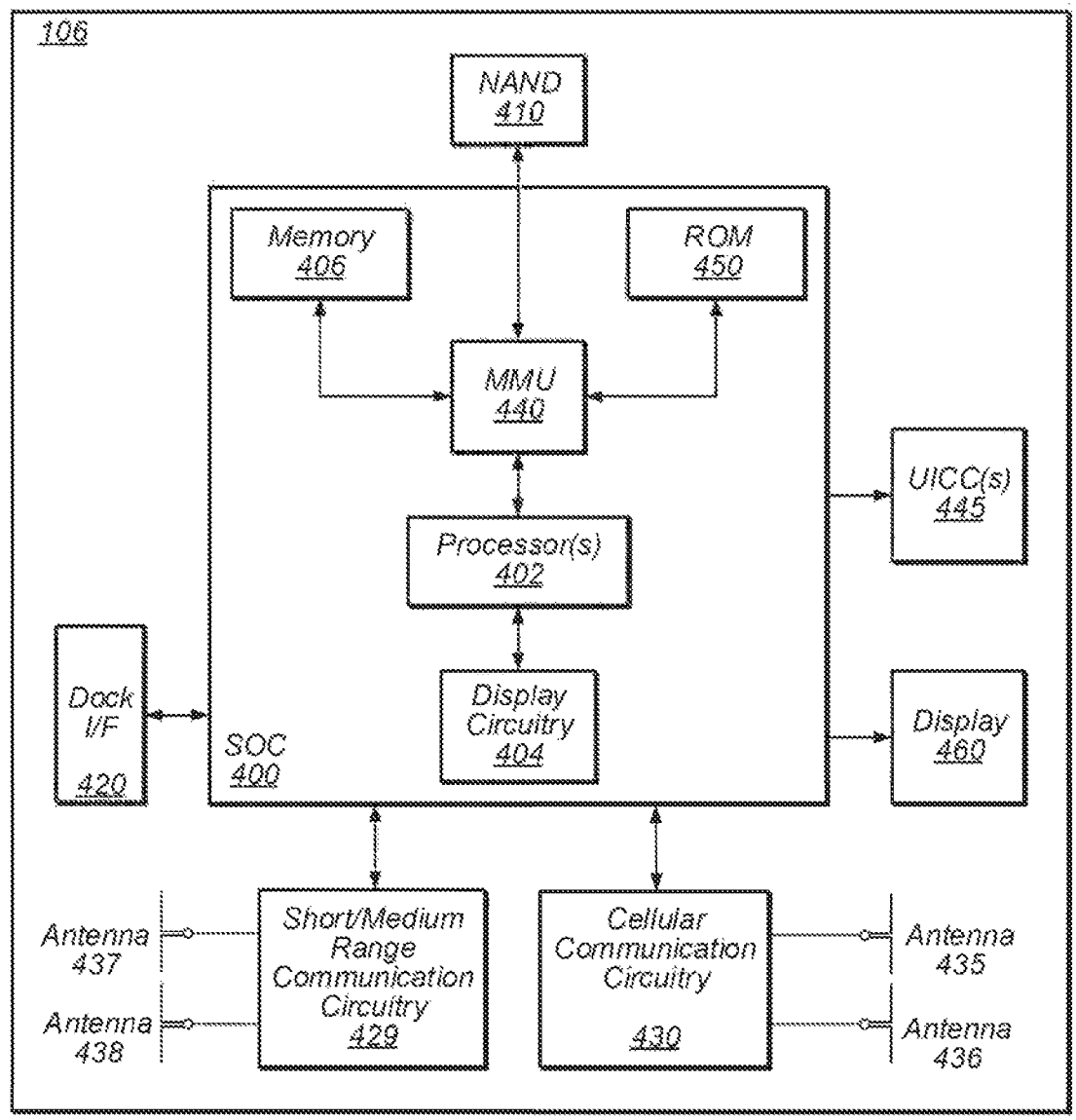
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for beam failure recovery based on a unified TCI framework, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
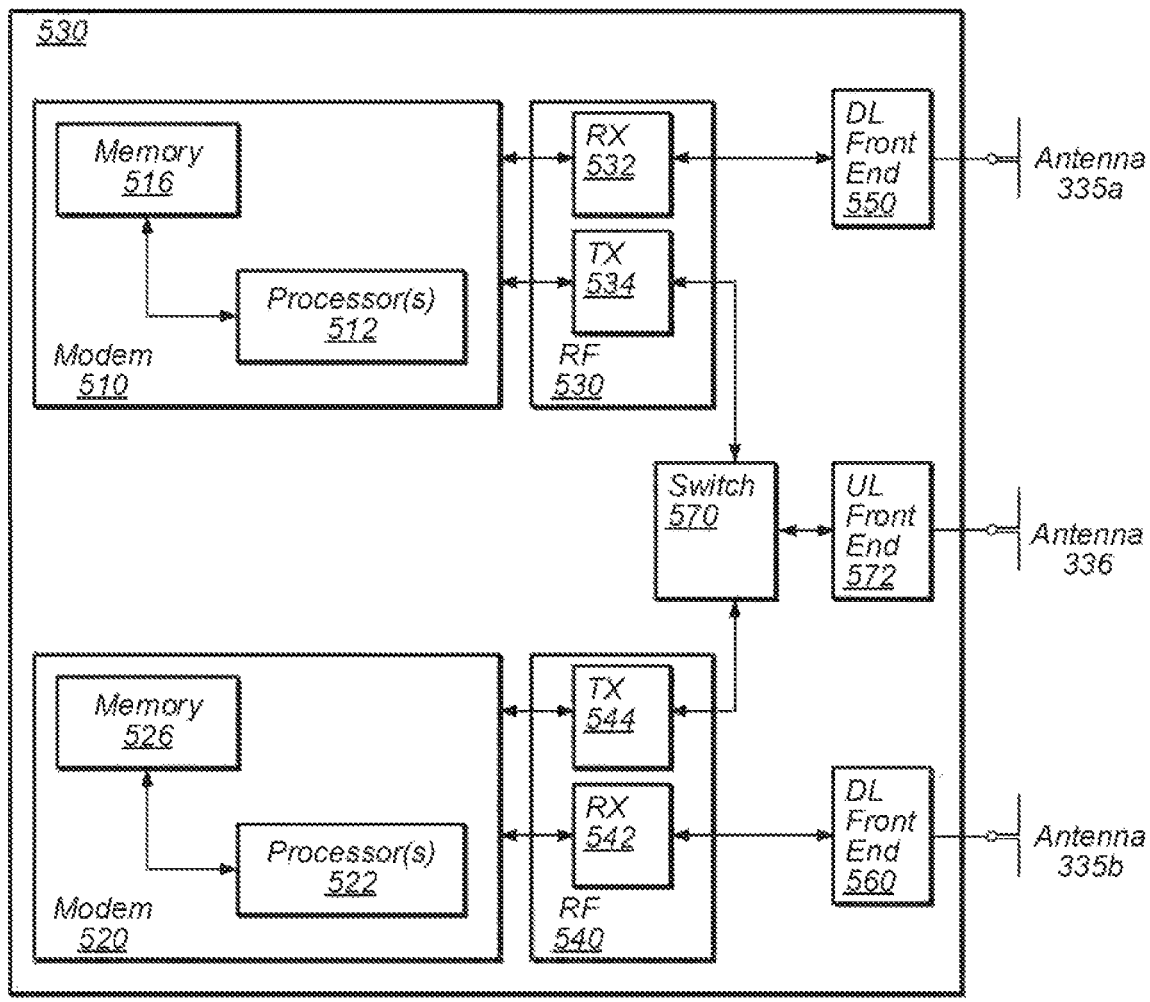
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a-b* and 436 as shown (in FIG. 4). In some embodiments, cellular communication circuitry 530 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods beam failure recovery based on a unified ICI framework, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
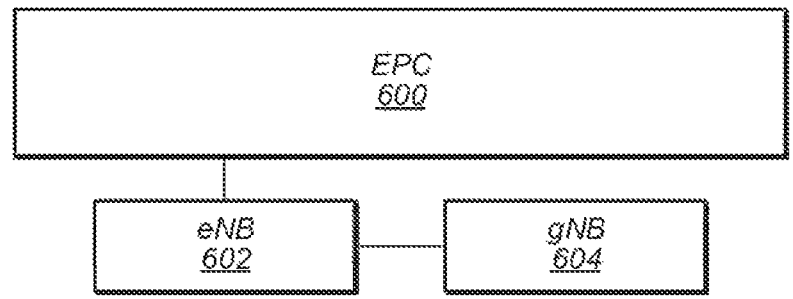
FIG. 6A illustrates an example of connections between an EPC network, an LTE base station (eNB), and a 5G NR base station (gNB).
Figure 6B:
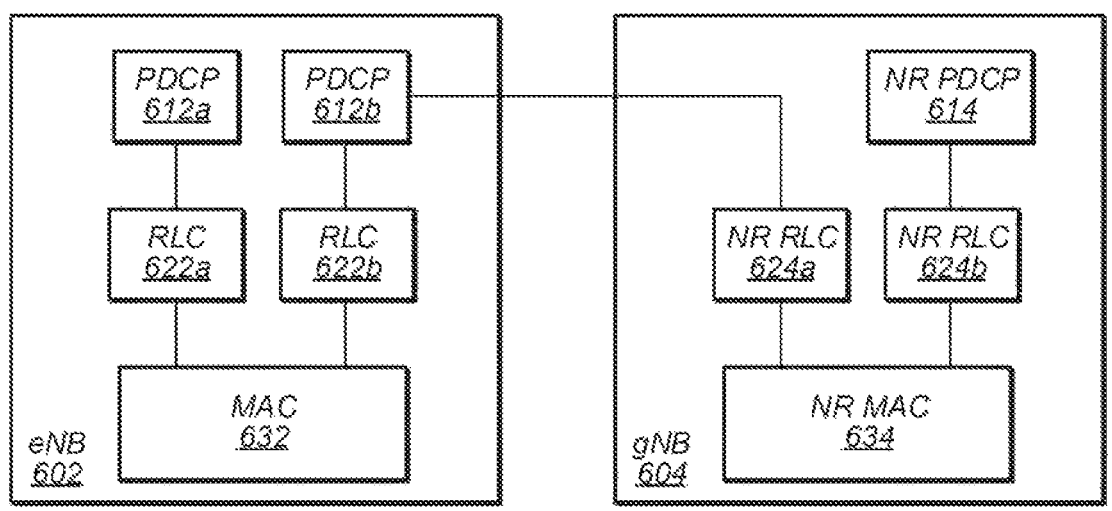
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
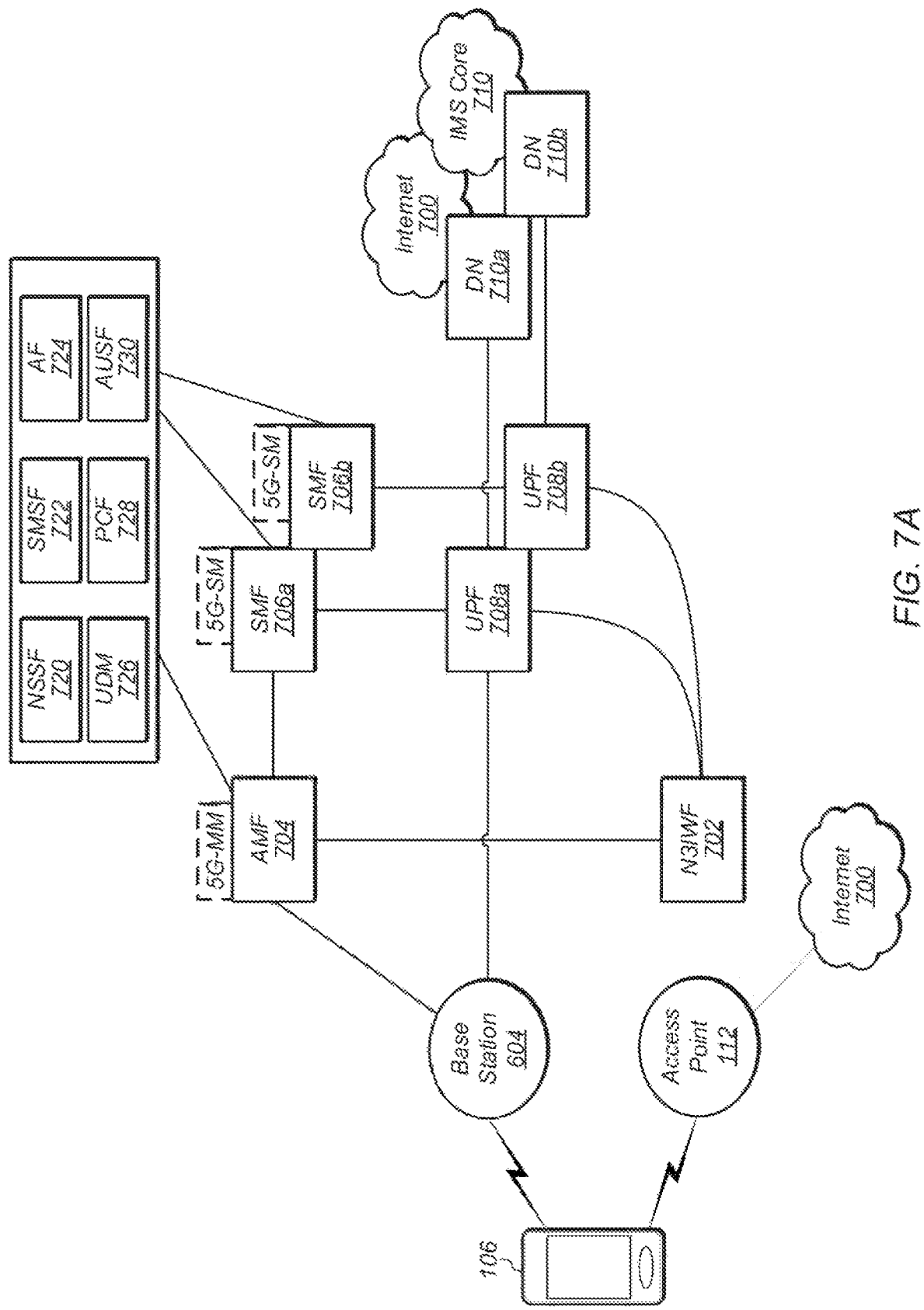
FIG. 7A illustrates an example of a 5G network architecture that incorporates both 3GPP (e.g., cellular) and non-3GPP (e.g., non-cellular) access to the 5G CN, according to some embodiments.
Figure 7B:
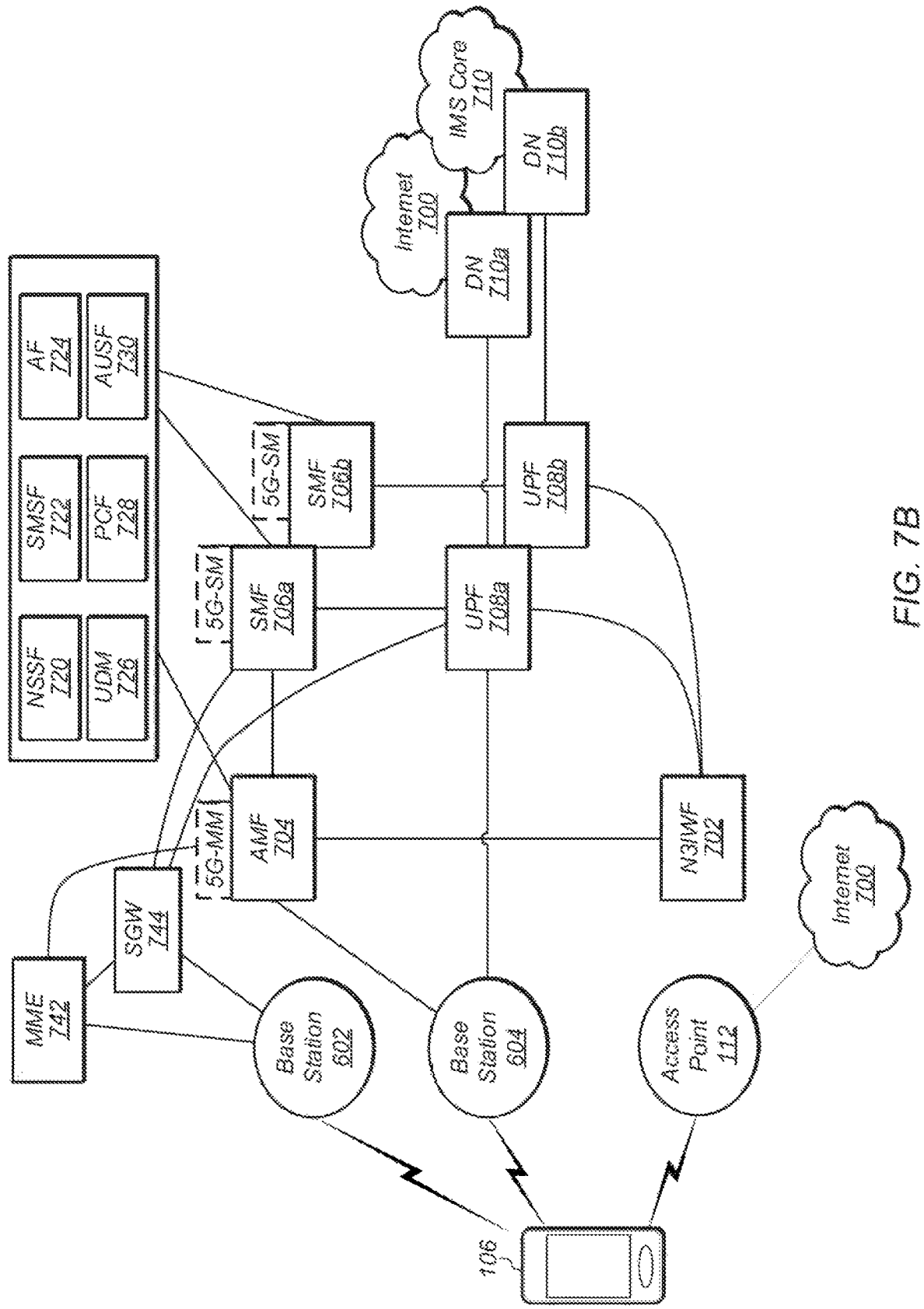
FIG. 7B illustrates an example of a 5G network architecture that incorporates both dual 3GPP (e.g., LTE and 5G NR) access and non-3GPP access to the 5G CN, according to some embodiments.
Figure 8:
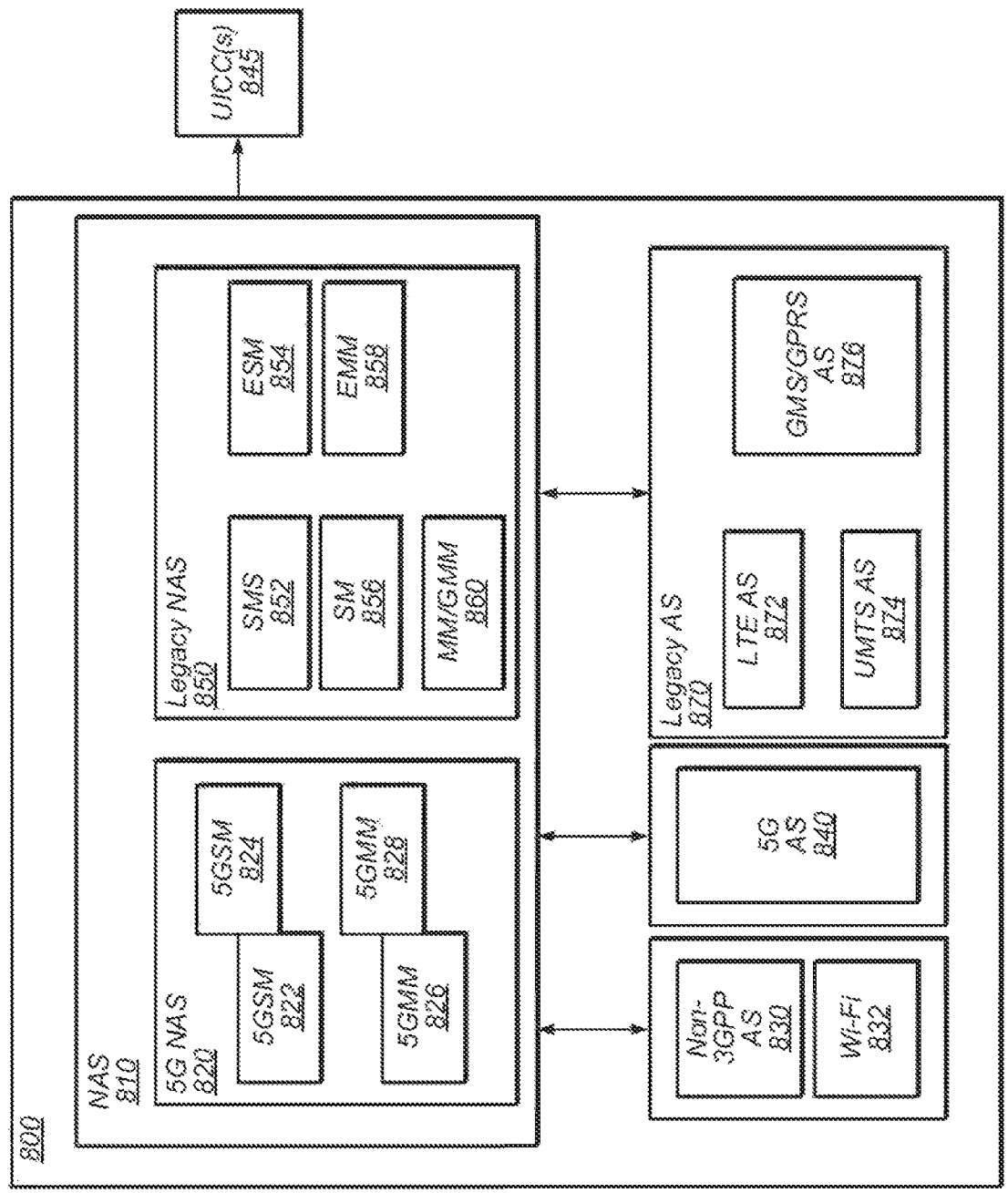
FIG. 8 illustrates an example of a baseband processor architecture for a UE, according to some embodiments.

FIGS. 7A, 7B and 8: 5G Core Network Architecture—Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. In some embodiments, such functional entities may reside on (and/or be executed by and/or be supported by) one or more servers 104 located within the RAN and/or core network. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMP' 706 may be connected to (or in communication with) the SMF 706a. In some embodiments, such functional entities may reside on (and/or be executed by and/or be supported by) one or more servers 104 located within the RAN and/or core network. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to implement mechanisms for a measurement period extension procedure, e.g., as further described herein.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods overhead reduction for multi-carrier beam selection and power control, e.g., as further described herein.

UE Measurement Beam Sweeping with LBT for Spectrum Above 52.6 GHz

In some existing implementations, a listen before talk (LBT) mechanism may be used to access shared medium (e.g., such as unlicensed bands commonly used for Wi-Fi, Bluetooth, and other short to medium range communications, e.g., non-3GGP access) to avoid conflicts or collisions (e.g., of transmissions emanating from two or more wireless devices attempting to access the shared medium) and to improve medium utilization efficiency. However, LBT mechanisms are not collision free. In other words, LBT mechanisms cannot guarantee collision free transmissions.

For example, in the case of a uni-cast transmission, a transmitter may readily detect a transmission collision based on a receiver's acknowledgement/negative acknowledgement (ACK/NACK) feedback. However, in the case of a multi-cast (or group-cast) transmission, a transmitter may not easily detect a collision based on receivers' ACK/NACKs due, at least in part, to heavy traffic associated with ACK/NACKs from multiple receivers and to a transmitter's inability to distinguish between (or isolate) transmission collisions from channel quality issues based on received ACK/NACKs. In other words, since receivers in a multi-cast transmission may have different locations with differing channel quality, a reason for a NACK (e.g., transmission collision versus poor channel quality) cannot be determined by the transmitter. Additionally, in the case of a broadcast transmission, feedback from receivers is known to not be feasible, thus, a transmitter has no knowledge of collisions. Further, in some implementations, a transmitter may reserve periodic slots within a reservation period for communication. In such implementations, if collisions occur, the collisions could persist for at least a portion of the reservation period (and in a worst-case scenario, the duration of the reservation period) if the transmitter does not detect (or is unable to detect) the collisions.

In current implementations of 3GPP 5G NR, studies in extending current NR operation to 71 GHz are related to UE measurements involving physical layer procedures. For example, some studies have been directed toward enhancing timing associated with beam-based operations to new sub-carrier spacing (e.g., 480 kHz and/or 960 kHz) in shared spectrum operations. Additionally, other studies have been directed toward channel access mechanisms using beam-based operations that comply with regulatory requirements associated with the unlicensed spectrum between 52.6 GHz and 71 GHz. Furthermore, some studies have attempted to specify listen before talk (LBT) and non-LBT procedures (of which no additional sensing mechanism is specified) with regard to omni-directional LBT, directional LBT, energy detection threshold enhancement, and receiver assistance in channel access. Moreover, some core specifications regarding new bands for the 52.6 GHz-71 GHz frequency range have been discussed in addition to defining uplink (UL) and downlink (DL) operation within the bands and excluding the intelligent transportation system (ITS) spectrum in said frequency range. Additionally, base station, UE radio-frequency (RF), radio resource management (RRM), radio link monitoring (RLM), and broadcast multicast (BM) core requirements for bands (and combinations of bands) in the 52.6 GHz-71 GHz frequency range have also been studied.

Furthermore, when a UE makes a cell specific measurement during an LBT procedure in an NR environment, the UE may be susceptible to or experience LBT failures. These LBT failures may involve the UE performing beam measurements in the higher, unlicensed spectrum of the 52.6 GHz-71 GHz frequency range.

Accordingly, some conclusions were made as a result of the studies described above. For example, synchronization signal block (SSB) transmission with LBT may be supported at least when the conditions for contention exempt short control signaling based SSB transmission is not met. Moreover, channel access for SSB with LBT may not be different from a normal channel occupancy time (COT) with multiple beams. Additional studies in the future may determine if any difference from a multi-beam COT LBT needs to be introduced.

In regard to SSB transmission in LBT, potential issues may arise when the UE performs measurements in a beam sweep procedure. For example, LBT failures may occur when the UE performs a measurement of an SSB burst that corresponds to an already occupied channel. In other words, a competing device, e.g., such as a Wi-Fi device, may already be attached and utilizing the channel associated with the SSB burst.

Figure 9:
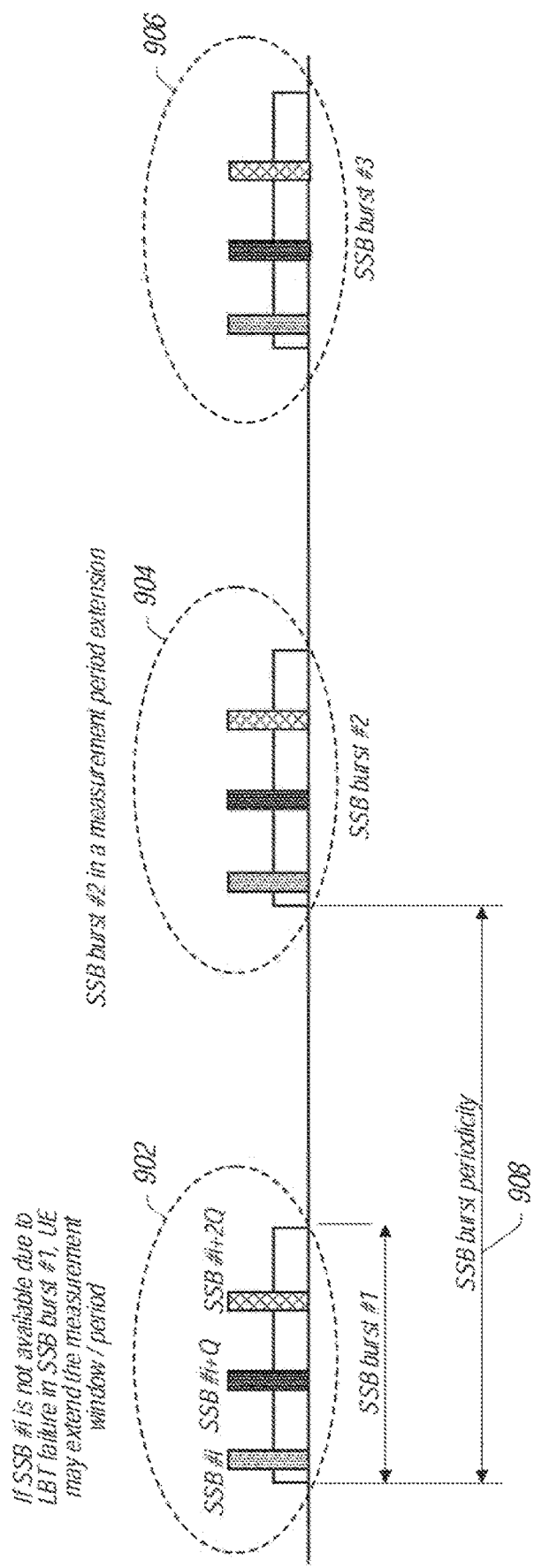
FIG. 9 illustrates an example LBT procedure involving SSB burst transmissions and experiencing LBT failures due to unavailable SSBs, according to some embodiments.

For example, as shown in FIG. 9, a UE may receive an SSB burst (e.g., SSB burst #1) that includes multiple SSBs such as SSB #i, SSB #i+Q and SSB #i+2Q where i is an actual SSB index and Q is an SSB quasi-collocated (QCL) distance in the SSB burst for the same actual SSB index. In other words, i, i+Q, and i+2Q may correspond to QCL SSB positions. Additionally, the SSB burst may have an associated periodicity (e.g., SSB-Based RRM Measurement Timing Configuration (SMTC) or Discovery Burst Transmission Window (DBTW) periodicity) 908 between bursts.

In the scenario that SSB #i is not available due to LBT failure in SSB burst #1 (902), the UE may be configured to extend the measurement period or window in order to continue its LBT measurements as is customary for LBT beam management procedures. In doing so, the UE may receive SSB burst #2 (904) (or even SSB burst #3 (906)) in a measurement period extension. However, the UE may further need to determine which receiving beam to utilize in a measurement period extension and potentially comprised of new SSB burst #2. Additionally, and/or alternatively, the UE may need to determine how many SSB bursts are needed for a measurement period extension corresponding to the UE's receiving beam sweeping pattern. Accordingly, the embodiments described hereinafter seek to address these needs.

Method of Extending a Beam Measurement Period in Response to Determining a LBT Failure Embodiments described herein provide mechanisms for mitigation of listen before talk (LBT) conflicts in the unlicensed spectrum. A wireless device may receive one or more synchronization signal blocks (SSBs) from a base station (BS) as part of an LBT procedure. The wireless device may determine one or more LBT failures associated with one or more receive beams of the wireless device. Furthermore, in response to determining the one or more LBT failures associated with the one or more receive beams of the wireless device, the wireless device may extend a measurement period for the one or more receive beams of the wireless device. The wireless device may then receive one or more additional SSBs on the one or more receive beams of the wireless device.

Figure 11:
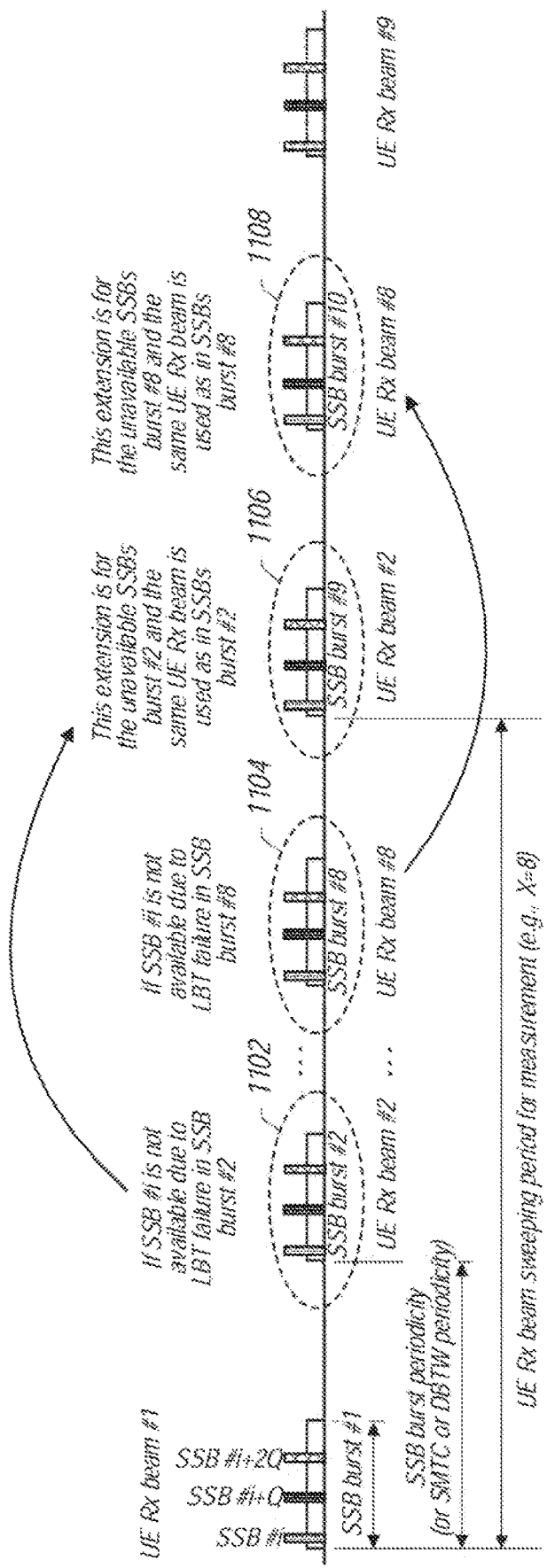
FIG. 11 illustrates an example of an extension of a beam measurement period for beams that experienced LBT failures, according to some embodiments.
Figure 12:
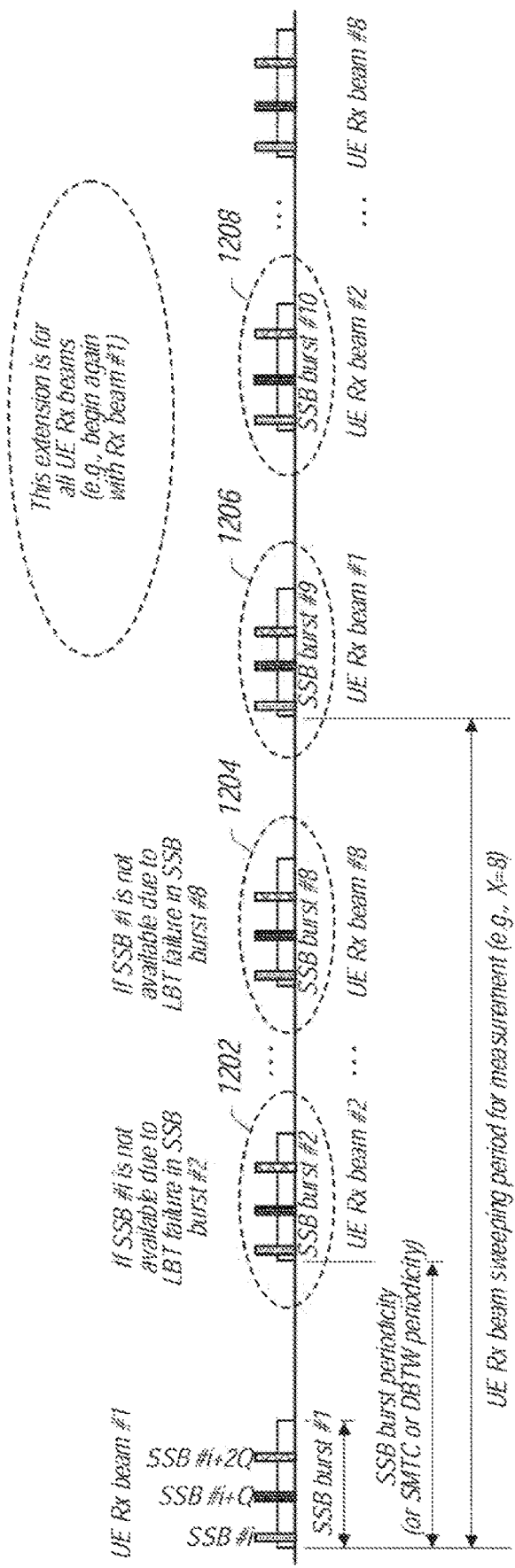
FIG. 12 illustrates an example of an extension of a beam measurement period for all receiving beams, regardless of which ones experienced LBT failures, according to some embodiments.
Figure 13:
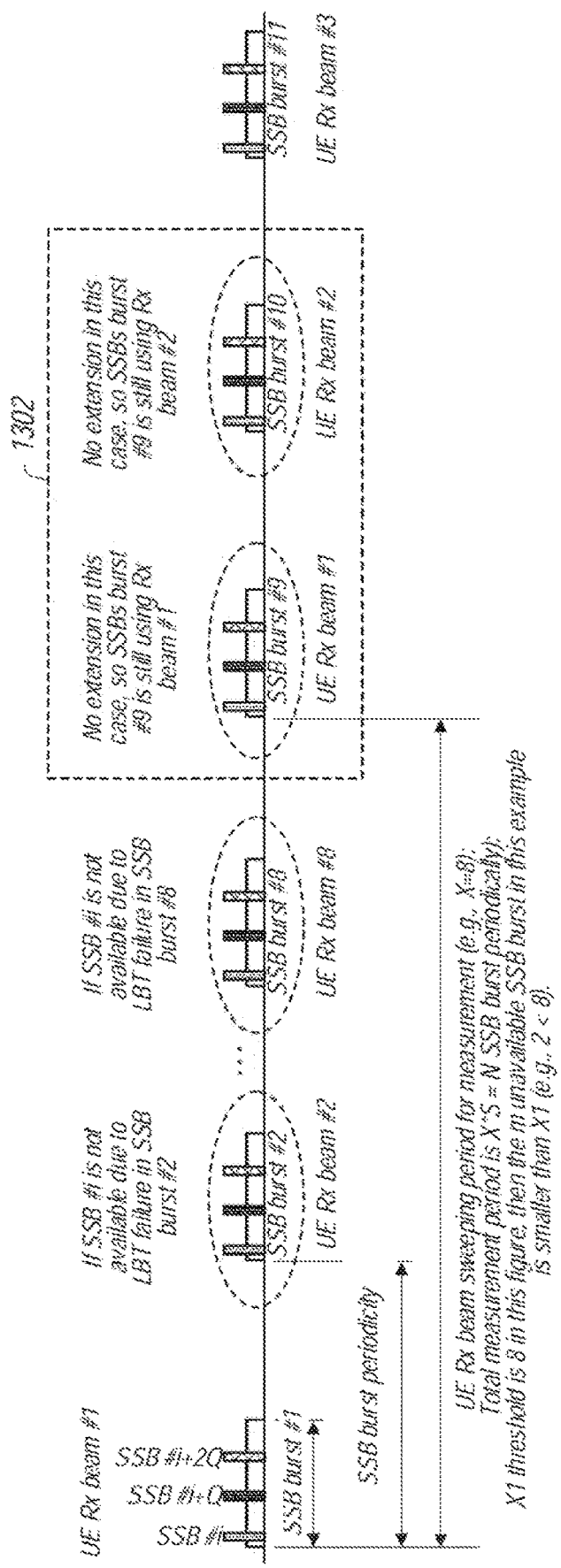
FIG. 13 illustrates an example of an of a wireless device not extending a beam measurement period in response to determining that a number of LBT failures does not exceed a threshold, according to some embodiments.

For example, in some embodiments, the UE may need a measurement period extension applied to one received beam. On the other hand, the UE may need a measurement period extension for all received beams in the sweeping pattern, according to some embodiments. As an example, an extension of the beam measurement period may be made by the wireless device specifically for beams that experienced LBT failures, e.g., as illustrated by FIG. 11. As another example, the wireless device may extend the beam measurement period for all receiving beams in response to determining a LBT failure or unavailable SSB, e.g., as illustrated by FIG. 12. As a further example, the wireless device may forego extending the beam measurement period in response to determining that the number of LBT failures does not exceed a threshold, e.g., as illustrated by FIG. 13.

Figure 10:
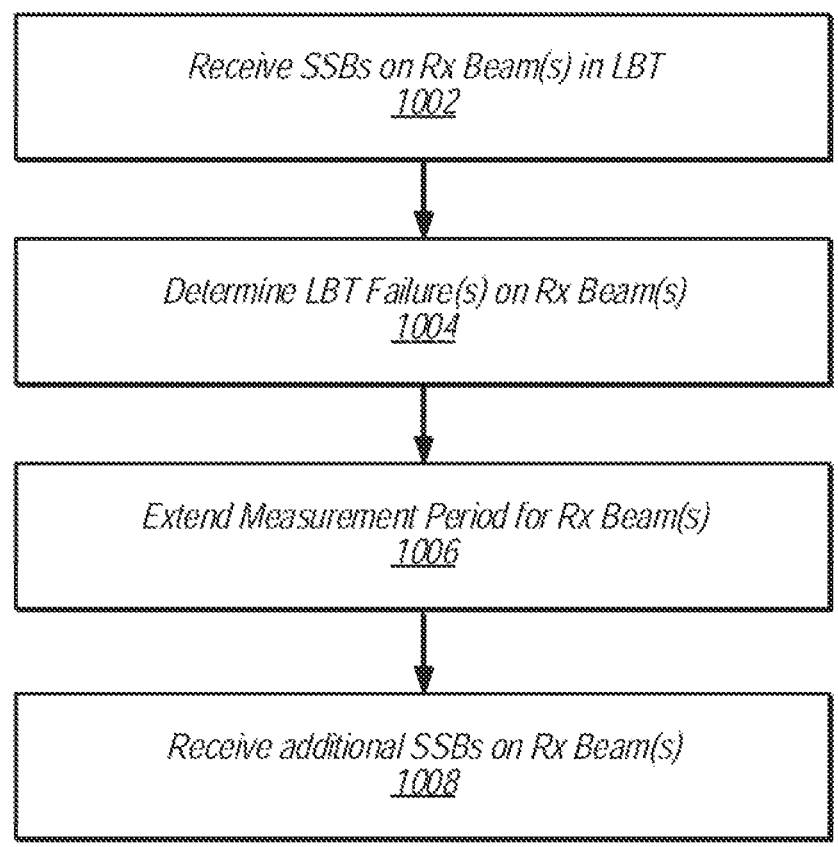
FIG. 10 illustrates a block diagram of an example of a method of extending a beam measurement period in response to determining an LBT failure, according to some embodiments.

FIG. 10—Exemplary Method of Extension of the Beam Measurement Period

FIG. 10 illustrates a block diagram of an exemplary method of extending a beam measurement period in response to determining a LBT failure, according to some embodiments. The method shown in FIG. 10 may be used in conjunction with any of the systems or devices shown in the Figures, among other devices. In various embodiments, some of the method elements shown may be performed concurrently, in a different order than shown, or may be omitted. Additional method elements may also be performed as desired. As shown, this method may operate as follows.

In 1002, a UE, such as UE 106, may receive a synchronization signal block (SSB) burst from a base station, such as base station 102, while performing listen before talk (LBT) procedures. For example, in order to perform measurements necessary for evaluating available and/or compatible channels and/or cells, the UE may perform measurements on SSBs received from one or more cells. In doing so, the UE may determine whether it can utilize associated channels and/or cells, e.g., based on time and frequency resources determined through measurement of the SSBs. In other words, the UE may determine whether its transmission and reception protocols are compatible with the base station's associated cells. Further, when the UE determines that its transmission and reception protocols are compatible with the base station, the UE may potentially attach to a cell of a base station, e.g., when the cell available.

In 1004, the UE may determine and/or experience an LBT failure associated with an unavailable SSB in a received SSB burst. For example, the UE may perform a measurement of an SSB burst that corresponds to an already occupied channel. Accordingly, an SSB in the SSB burst may be unavailable to the UE, thereby indicating an occupied channel. In other words, a competing device (e.g., Wi-Fi device or other UE) may already be attached and utilizing the channel associated with the SSB burst and a particular SSB index. Additionally and/or alternatively, the UE may determine which Rx beams may require an extended measurement period due to LBT failures. As an example, the UE may (optionally) only extend the measurement period for Rx beams that have received unavailable SSBs in an SSB burst. Additionally and/or alternatively, the UE may determine that the measurement period for all Rx beams should be extended regardless of which Rx beams experienced LBT failures.

In 1006, the UE may, in response to determining which Rx beams to extend the measurement period for (as described above in 1004), perform said extension of the measurement period. For example, the UE may extend the measurement period only for beams which have experienced LBT failures (as described above in regard to FIG. 11). Additionally and/or alternatively, the UE may extend the measurement period for all available Rx beams. In other words, the UE may continue its Rx beam sweeping procedure starting again with the first Rx beam.

In 1008, the UE may receive additional SSB bursts on particular ones and/or all of its Rx beams (as previously determined at 1004) and the UE may perform additional measurements in the measurement extension period. Furthermore, if and/or when the UE encounters additional LBT failures and/or unavailable SSBs in the measurement extension period, the UE may be further configured to repeat the method until it has successfully measured the appropriate SSB bursts associated with its Rx beams and/or not exceeded the failure threshold.

FIG. 11—Extension of Beam Measurement Period for Beams Corresponding to LBT Failures FIG. 11 illustrates an extension of the beam measurement period specifically for beams that experienced LBT failures, according to some embodiments.

For example, in some embodiments, the UE may use the same receive beam on all quasi-colocated (QCL) SSB positions (e.g., have the same actual SSB index) in a SSB burst. Furthermore, the UE receiving beam sweeping factor for mobility-based measurements may be defined as X (e.g., X≥8). In this example, if m SSB burst (or SSB-based RRM Measurement Timing Configuration (SMTC)) is not available in a UE measurement period due to a LBT failure, the measurement period extension may be defined as m SSB burst. In other words, the measurement extension period may correspond to m number of unavailable SSB bursts, according to some embodiments. Furthermore, in the extended SSB bursts for this measurement period, the UE may perform measurement by using the same receiving beam as the ones in the previously unavailable SSB bursts of this measurement period. In other words, if during a UE's measurement period it encounters unavailable SSBs (e.g., SSB #i in SSB bursts #2 (1102) and #8 (1104)) corresponding to particular receive beams (e.g., UE Rx beam #2 and #8) as shown in FIG. 11, the UE may extend the measurement period for Rx beam #2 and #8 to perform additional measurements on new SSB bursts #9 (1106) and #10 (1108) respectively.

Moreover, in this example, the total measurement period including the UE's measurement extension may be defined as $T_{base}+m*T_{SSB\ burst\ periodicity}*F_{scaling}$ where $T_{base}$ is the baseline measurement period without LBT failure (e.g., N SSB burst periodicities/SMTC periodicities), m is the unavailable SSB burst due to LBT failure, $F_{scaling}$ is the measurement resource sharing factor (e.g., carrier specific scaling factor (CSSF)), and $T_{SSB\ burst\ periodicity}$ may be SSB burst periodicity, SMTC periodicity, or Discovery Burst Transmission Window (DBTW) periodicity.

In some embodiments, the UE may experience or determine additional LBT failures in the extended measurement period. For example, having already extended the measurement period for Rx beam #2 and #8 to perform additional measurements on new SSB bursts #9 (1106) and #10 (1108) respectively, the UE may need to perform further extensions of the already extended measurement period if it encounters LBT failures in SSB bursts 1106 and 1108 in the extended measurement period. In other words, the UE may be configured to extend the measurement period multiple times for particular Rx beams if said particular beams keep experienced LBT failures or unavailable SSBs.

Furthermore, if the number of SSB bursts or SMTC for extension has exceeded a maximum number of extensions value or threshold (e.g., maximum extension value Y) and the number of available SSB bursts or SMTC still cannot reach the total number of Rx beams N, the UE may be configured to restart the measurement from the beginning, according to some embodiments. In doing so, the UE may drop (e.g., discard) all previously received samples from the physical layer (PHY).

Additionally, if the available measured SSB burst number in the total measurement period with extension is greater than some percentage (e.g., k %*N, where k may be a determined or configured percentage value), the UE may use available measurement SSB for the measurement results determination, according to some embodiments. Additionally, or alternatively, if the total number of the LBT failures is less than a percentage k % of the maximum number of receive beams N, the UE may be configured to determine measurement results based on the successfully (e.g., non-failed) received SSBs.

However, if the available measured SSB burst number in the total measurement period with extension is less than k %*N or if the total number of the LBT failures is more than a percentage k % of the maximum number of receive beams N, the UE may restart the measurement from the beginning as previously described and ultimately discard the previously received physical layer (PHY) samples.

FIG. 12—Extension of the Beam Measurement Period for All Receive Beams

FIG. 12 illustrates an extension of the beam measurement period for all receiving beams in response to determining a LBT failure or unavailable SSB, according to some embodiments.

Similar to the extension of the measurement period as described above in regard to FIG. 11, a UE may use the same receive beam on all quasi-colocated (QCL) SSB positions (e.g., have the same actual SSB index) in a SSB burst. Furthermore, the UE receiving beam sweeping factor for mobility-based measurements may be defined as X (e.g., X≥8). In some embodiments, if m SSB burst (or SMTC) is not available in a UE measurement period due to a LBT failure or determined unavailable SSB, the measurement period extension may be defined as m*X or $$\text{ceiling}\left(\frac{m}{X}\right) * X\ SSB\ \text{burst}.$$

More specifically, in some embodiments, the ceiling factor or value may correspond to a maximum beam sweeping number of the UE. In this example, in the extended SSB bursts for this measurement period, the UE may perform measurements using the Rx beam sweeping of all possible Rx beams. In other words, rather than only extending the measurement period only for Rx beams corresponding to LBT failures or unavailable SSBs, the UE may be configured to extend the measurement period for all receive beams of the UE, regardless of whether or not all Rx beams experienced LBT failures.

According to some embodiments as shown in FIG. 12, if during a UE's measurement period it encounters unavailable SSBs (e.g., SSB #1 in SSB bursts #2 (1202) and #8 (1204)) corresponding to particular receive beams (e.g., UE Rx beams #2 and #8), the UE may extend the measurement period for all Rx beams to perform additional measurements on new SSB bursts. For example, having determined LBT failures associated with Rx beams #2 and #8, the UE may extend the measurement period for all of its Rx beams and starting again with Rx beams #1 and #2, the UE may perform additional measurements of SSB burst #9 (1206) and SSB burst #10 (1208) respectively in the extended measurement window.

Moreover, in this example, the total measurement period including the UE's measurement extension may be defined as $T_{base}+m*X*T_{SSB\ burst\ periodicity}*F_{scaling}$ or $$T_{base} + \text{ceiling}\left(\frac{m}{X}\right)*X*T_{SSBburstperiodicity}$$

where $T_{base}$ is the baseline measurement period without LBT failure (e.g., N SSB burst periodicities or SMTC periodicities), m is the unavailable SSB burst due to LBT failure, $F_{scaling}$ is the measurement resource sharing factor (e.g., carrier specific scaling factor), and $T_{SSB\ burst\ periodicity}$ may be SSB burst periodicity, SMTC periodicity, or DBTW periodicity.

In some embodiments, the UE may experience or determine additional LBT failures or unavailable SSBs in the extended measurement period. For example, having already extended the measurement period for all Rx beams #1-#8 to perform additional measurements on new SSB bursts (due to one or more LBT failures), the UE may need to perform further extensions of the already extended measurement period if it encounters LBT failures in SSB bursts in the extended measurement period. In other words, the UE may be configured to extend the measurement period multiple times for all Rx beams if any of the beams experience additional LBT failures or unavailable SSBs in extended measurement periods.

Furthermore, if the number of SSB bursts or SMTC for extension has exceeded a maximum number of extensions value or threshold (e.g., maximum extension value Y) and the number of available SSB bursts or SMTC still cannot reach the total number of Rx beams N, the UE may be configured to restart the measurement from the beginning, according to some embodiments. In doing so, the UE may drop (e.g., discard) all previously received samples from the physical layer (PHY).

Additionally, if the available measured SSB burst number in the total measurement period with extension is greater than some percentage (e.g., k %*N, where k may be a determined or configured percentage value), the UE may use available measurement SSB for the measurement results determination, according to some embodiments. Additionally, or alternatively, if the total number of the LBT failures is less than a percentage k % of the maximum number of receive beams N, the UE may be configured to determine measurement results based on the successfully (e.g., non-failed) received SSBs.

However, if the available measured SSB burst number in the total measurement period with extension is less than k %*N or if the total number of the LBT failures is more than a percentage k % of the maximum number of receive beams N, the UE may restart the measurement from the beginning as previously described and ultimately discard the previously received physical layer (PHY) samples.

FIG. 13—Non-Extension of the Beam Measurement Period Due to Not Exceeding a Threshold FIG. 13 illustrates a wireless device's ability to optionally not extend the beam measurement period in response to determining that the number of LBT failures does not exceed a threshold, according to some embodiments.

As similarly described with regard to FIGS. 11 and 12, a wireless device (e.g., a user equipment (UE)) may use the same receive beam on all quasi-colocated (QCL) SSB positions (e.g., have the same actual SSB index) in a SSB burst. Furthermore, the UE receiving beam sweeping factor for mobility-based measurements may be defined as X (e.g., X≥8). In some embodiments, if SSB burst or SMTC is not available in a UE measurement period due to LBT failure (e.g., unavailable SSB(s)) and m<X1 (where X1≤X), the measurement period extension may not be necessary. In other words, if a UE experiences a certain number of LBT failures but is still within acceptable measuring limits (e.g., does not exceed the threshold (m<X1)), the UE may still be able to successfully complete its LBT beam sweeping measurements and begin appropriate attach procedures to the corresponding cell.

For example, according to some embodiments as shown in FIG. 13, the UE may experience multiple LBT failures associated with Rx beam #2 and Rx beam #8 due to unavailable SSB #i in both SSB burst #2 and SSB burst #8, respectively. However, the UE may optionally not extend the measurement period due to the fact that the X1 threshold is 8 and the m unavailable SSB bursts is 2 in this example. Therefore, since the m unavailable SSB bursts is less than the threshold, the UE may continue the LBT process without extending the measurement window and continuing its measurement with UE Rx beam #1 and SSB burst #9 and UE Rx beam #2 and SSB burst #10 as outlined in FIG. 13 by 1302.

Alternatively, in some embodiments, in SSB burst or SMTC is not available in a UE measurement period due to LBT failure (e.g., unavailable SSB(s)) and m≥X1 (where X1≤X)), the measurement period extension may be necessary and be characterized by $$\text{floor}\left(\frac{m}{X1}\right)*X*SSB \text{ burst periodicity.}$$

More specifically, in some embodiments, the floor factor or value may correspond to a predefined beam sweeping factor of the UF. Moreover, this predefined beam sweeping factor of the UE may be less than or equal to a maximum beam sweeping number of the UE. Moreover, if the UE docs extend the measurement period and receives extended SSB bursts, the UE may perform measurements by using all possible receive beams (Rx beams). Furthermore, the total measurement period after the extension may be defined as $$T_{base} + \text{floor}\left(\frac{m}{X}\right)*X*T_{SSB\ burst\ periodicity}*F_{scaling}$$

where as described above, $T_{base}$ is the baseline measurement period without LBT failure (e.g., N SSB burst periodicities or SMTC periodicities), m is the unavailable SSB burst due to LBT failure, $F_{scaling}$ is the measurement resource sharing factor (e.g., carrier specific scaling factor (CSSF)), and $T_{SSB\ burst\ periodicity}$ may be SSB burst periodicity, SMTC periodicity, or DBTW periodicity.

Moreover, in some embodiments, in the scenario in which the UE extends the measurement period, the UE may experience additional LBT failures or unavailable SSBs in the extended window. In this case, the UE may be further configured to apply the same procedure again for a further period extension in which the number of SSB bursts or SMTCs would be derived based on $$\text{floor}\left(\frac{m1}{X1}\right)*X.$$

Furthermore, if the number of SSB bursts or SMTC for extension has exceeded a maximum number of extensions value or threshold (e.g., maximum extension value Y) and the number of available SSB bursts or SMTC still cannot reach the total number of Rx beams N, the UE may be configured to restart the measurement from the beginning, according to some embodiments. In doing so, the UE may drop (e.g., discard) all previously received samples from the physical layer (PHY).

Additionally, if the available measured SSB burst number in the total measurement period with extension is greater than some percentage (e.g., k %*N, where k may be a determined or configured percentage value), the UE may use available measurement SSB for the measurement results determination, according to some embodiments. Additionally, or alternatively, if the total number of the LBT failures is less than a percentage k % of the maximum number of receive beams N, the UE may be configured to determine measurement results based on the successfully (e.g., non-failed) received SSBs.

However, if the available measured SSB burst number in the total measurement period with extension is less than k %*N or if the total number of the LBT failures is more than a percentage k % of the maximum number of receive beams N, the UE may restart the measurement from the beginning as previously described and ultimately discard the previously received physical layer (PHY) samples.

Figure 14:
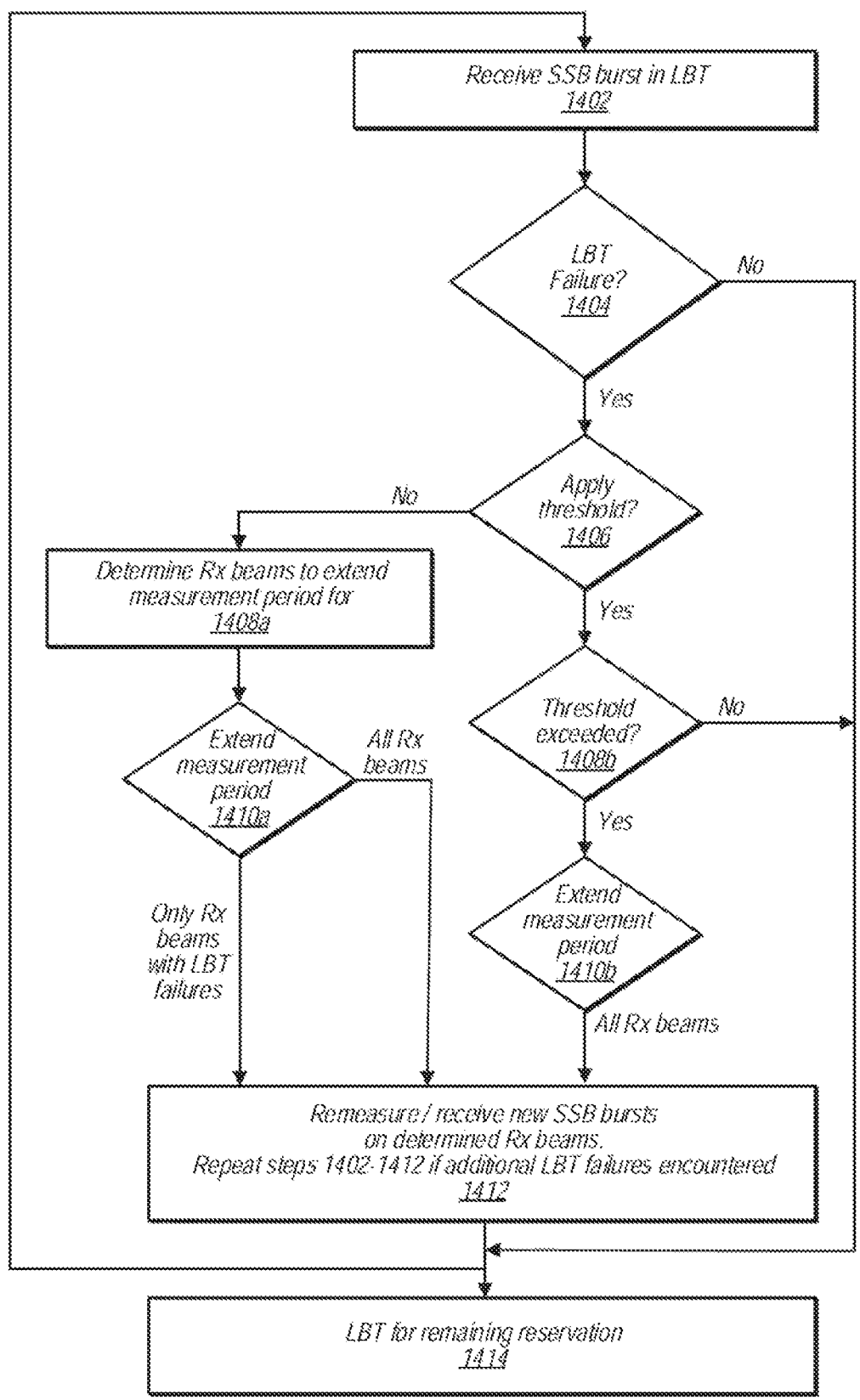
FIG. 14 illustrates a block diagram of an example of a method of extending a beam measurement period in response to determining a LBT failure and optionally including a threshold measurement, according to some embodiments.

FIG. 14—Method of Extending a Beam Measurement Period (with Optional Threshold Measurement) in Response to Determining a LBT Failure FIG. 14 illustrates a block diagram of an example of a method of extending a beam measurement period in response to determining a LBT failure and optionally including a threshold measurement, according to some embodiments. The method shown in FIG. 14 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1402, a UE, such as UE 106, may receive a synchronization signal block (SSB) burst from a base station, such as base station 102, while performing listen before talk (LBT) procedures. For example, in order to perform measurements necessary for evaluating available and/or compatible channels and/or cells, the UE may perform measurements on SSBs received from one or more cells. In doing so, the UE may determine whether it can utilize associated channels and/or cells, e.g., based on time and frequency resources determined through measurement of the SSBs. In other words, the UE may determine whether its transmission and reception protocols are compatible with the base station's associated cells. Further, when the UE determines that its transmission and reception protocols are compatible with the base station, the UE may potentially attach to a cell of a base station, e.g., when the cell available.

At 1404, the UE may determine and/or experience an LBT failure associated with an unavailable SSB in a received SSB burst. For example, the UE may perform a measurement of an SSB burst that corresponds to an already occupied channel. Accordingly, an SSB in the SSB burst may be unavailable to the UE, thereby indicating an occupied channel. In other words, a competing device (e.g., Wi-Fi device or other UE) may already be attached and utilizing the channel associated with the SSB burst and a particular SSB index.

At 1406, the UE may (optionally) elect to compare a threshold value (e.g., an upper limit of LBT failures) to a number of unavailable SSBs (e.g., LBT failures). For example, the UE may be configured to continue LBT operations normally even after encountering a number of LBT failures if and/or when the number of LBT failures encountered does not exceed the threshold value. Additionally and/or alternatively, the UE may be configured to apply the threshold value and extend a measurement period for its receive beams (Rx beams) if and/or when the number of LBT failures exceeds the threshold value. Accordingly, the UE may or may not apply such a threshold and therefore may proceed to 1408a and/or 1408b depending on the configuration of the UE.

For example, the UE may be configured to not utilize the threshold value and proceed to 1408a to determine which Rx beams may require an extended measurement period due to LBT failures. As an example, the UE may (optionally) only extend the measurement period for Rx beams that have received unavailable SSBs in an SSB burst. Additionally and/or alternatively, the UE may be configured to extend the measurement period for all Rx beams regardless of which Rx beams experienced LBT failures.

At 1410a, the UE, when configured to not utilize a threshold value in its measurement period extension procedure, may, in response to determining which Rx beams to extend the measurement period for, perform said extension of the measurement period. For example, the UE may extend the measurement period only for beams which have experienced LBT failures (as described above in regard to FIG. 11). Additionally and/or alternatively, the UE may extend the measurement period for all available Rx beams. In other words, the UE may continue its Rx beam sweeping procedure starting again with the first Rx beam. Accordingly, the UE may then proceed to 1412.

Alternatively, when the UE is configured to compare one or more LBT failures to a failure threshold, the UE may proceed from 1406 to 1408b in which the UE may determine whether the LBT failure threshold value has been exceeded. For example, as described above in regard to FIG. 13, the UE may compare the number of LBT failures to the threshold value and determine to not extend the measurement period if and/or when the number of LBT failures m is less than a failure threshold value X1 (where X1≤X), where X may be defined as the UE Rx beam sweeping period (typically shown as X=8 in the discussion of FIGS. 11-13). Accordingly, in this example of the LBT failures not exceeding the threshold value X1, the UE may then proceed to 1014 to complete the LBT procedure for the remaining reservation of resources and/or successful connection to a cell. Alternatively, if the number of LBT failures exceeds the failure threshold X1 (where X1≤X), the UE may proceed to 1410b.

In some embodiments, the UE may be configured to apply the failure threshold value and determine when the threshold value has been exceeded by the number of determined LBT failures. Accordingly, the UE may extend the measurement period/window for all receive (Rx) beams at 1410b. In other words, when the UE determines that the failure threshold has been exceeded, the UE may extend the measurement period for all Rx beams of the UE rather than only certain Rx beams corresponding to certain LBT failures. Accordingly, having extended the measurement window in response to detecting a number of LBT failures which exceeds the threshold value, the UE may then proceed to 1412.

At 1412, the UE may receive additional. SSB bursts on particular ones and/or all of its Rx beams (as previously determined at 1408*a*) and the UE may perform additional measurements in the measurement extension period. Furthermore, if and/or when the UE encounters additional LBT failures and/or unavailable SSBs in the measurement extension period, the UE may be further configured to repeat the method until it has successfully measured the appropriate SSB bursts associated with its Rx beams and/or not exceeded the failure threshold.

At 1414, the UE may complete its LBT procedure for a remaining reservation and/or attempt to attach to an available cell.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
   memory storing instructions that, when executed, cause a user equipment (UE) to:
   receive one or more synchronization signal blocks (SSBs) on one or more receive beams as part of a measurement procedure with listen before talk (LBT);
   determine one or more synchronization signal block (SSB) based radio resource measurement (RRM) timing configuration windows (SMTCs) are not available in a UE measurement period;
   select, in response to determining the one or more SMTCs are not available in the UE measurement period, a measurement period based on a sum of a first term and a second term, wherein the first term is a baseline measurement period and the second term is a product of a plurality of values including a carrier-specific scaling factor value, a SMTC periodicity value, a UE receive (Rx) beam sweeping factor, and a value based on the one or more SMTCs not being available in a UE measurement period; and
   perform measurements using the selected measurement period.

2. The processor of claim 1, wherein the measurements are performed in frequency spectrum above 52.6 gigahertz (GHz).

3. The processor of claim 2, wherein
   a subcarrier spacing of the one or more SSBs is one of 480 kilohertz (kHz) or 960 kHz.

4. The processor of claim 1, wherein the one or more SMTCs are not available in the UE measurement period due to one or more LBT failures.

5. The processor of claim 1,
   wherein the baseline measurement period is a number of SMTC periodicities.

6. The processor of claim 1,
   wherein the selected measurement period is based on a floor factor corresponding to a ratio of one or more LBT failures to a threshold value, and wherein the threshold value is less than or equal to a maximum number of receive beams of the one or more receive beams.

7. The processor of claim 1,
   wherein if the selected measurement period exceeds a maximum extension value and a total number of other receive beams of the one or more receive beams is less than a maximum number of receive beams of the one or more receive beams, wherein the other receive beams are not associated with one or more LBT failures, the instructions are further executable to cause the UE to:
   discard physical layer samples received on the one or more receive beams; and
   restart the measurement procedure with LBT.

8. The processor of claim 1, wherein if the selected measurement period exceeds a maximum extension value and a total number of other receive beams of the one or more receive beams is greater than a percentage of a maximum number of receive beams of the one or more receive beams, wherein the other receive beams are not associated with one or more LBT failures, the instructions are further executable to cause the UE to:
   determine measurement results based on SSBs received on the other receive beams.

9. A method, comprising:
  receiving one or more synchronization signal blocks (SSBs) on one or more receive beams as part of a measurement procedure with listen before talk (LBT);
  determining one or more synchronization signal block (SSB) based radio resource measurement (RRM) timing configuration windows (SMTCs) are not available in a UE measurement period;
  selecting, in response to determining the one or more SMTCs are not available in the UE measurement period, a measurement period based on a sum of a first term and a second term, wherein the first term is a baseline measurement period and the second term is a product of a plurality of values including a carrier-specific scaling factor value, a SMTC periodicity value, a UE receive (Rx) beam sweeping factor, and a value based on the one or more SMTCs not being available in a UE measurement period; and
  performing measurements using the selected measurement period.

10. The method of claim 9, wherein the measurements are performed in frequency spectrum above 52.6 gigahertz (GHz).

11. The method of claim 10, wherein a subcarrier spacing of the one or more SSBs is one of 480 kilohertz (kHz) or 960 kHz.

12. The method of claim 9, wherein the one or more SMTCs are not available in the UE measurement period due to one or more LBT failures.

13. The method of claim 9, wherein the baseline measurement period is a number of SMTC periodicities.

14. The method of claim 9, wherein the selected measurement period is based on a floor factor corresponding to a ratio of one or more LBT failures to a threshold value, and wherein the threshold value is less than or equal to a maximum number of receive beams of the one or more receive beams.

15. The method of claim 9, wherein if the selected measurement period exceeds a maximum extension value and a total number of other receive beams of the one or more receive beams is less than a maximum number of receive beams of the one or more receive beams, wherein the other receive beams are not associated with one or more LBT failures, the method further comprises:
  discarding physical layer samples received on the one or more receive beams; and
  restart the measurement procedure with LBT.

16. The method of claim 9, wherein if the selected measurement period exceeds a maximum extension value and a total number of other receive beams of the one or more receive beams is greater than a percentage of a maximum number of receive beams of the one or more receive beams, wherein the other receive beams are not associated with the one or more LBT failures, the method further comprises:
  determining measurement results based on SSBs received on the other receive beams.

17. A non-transitory computer readable storage medium storing program instructions executable by at least one processor to cause a user equipment (UE) to:
  receive one or more synchronization signal blocks (SSBs) on one or more receive beams as part of a measurement procedure with LBT;
  determine one or more synchronization signal block (SSB) based radio resource measurement (RRM) timing configuration windows (SMTCs) are not available in a UE measurement period;
  select, in response to determining the one or more SMTCs are not available in the UE measurement period, a measurement period based on a sum of a first term and a second term, wherein the first term is a baseline measurement period and the second term is a product of a plurality of values including a carrier-specific scaling factor value, a SMTC periodicity value, a UE receive (Rx) beam sweeping factor, and a value based on the one or more SMTCs not being available in a UE measurement period; and
  perform measurements using the selected measurement period.

18. The non-transitory computer readable storage medium of claim 17, wherein the measurements are performed in frequency spectrum above 52.6 gigahertz (GHz).

19. The non-transitory computer readable storage medium of claim 18, wherein a subcarrier spacing of the one or more SSBs is one of 480 kilohertz (kHz) or 960 kHz.

20. The non-transitory computer readable storage medium of claim 17, wherein the one or more SMTCs are not available in the UE measurement period due to one or more LBT failures.

* * * * *